(12) United States Patent
Murata

(10) Patent No.: US 8,011,789 B2
(45) Date of Patent: Sep. 6, 2011

(54) REAR PROJECTION DISPLAY

(75) Inventor: Taisuke Murata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 494 days.

(21) Appl. No.: 11/892,485

(22) Filed: Aug. 23, 2007

(65) Prior Publication Data

US 2008/0259288 A1   Oct. 23, 2008

(30) Foreign Application Priority Data

Apr. 20, 2007  (JP) ................. 2007-111732

(51) Int. Cl.
   *G03B 21/14*  (2006.01)
(52) U.S. Cl. ............. 353/69; 353/30; 353/31; 353/70; 353/74; 353/119; 348/745; 348/744; 348/750; 348/751; 348/658; 348/657; 349/5; 349/7; 349/9; 250/548; 252/299.61
(58) Field of Classification Search ............ 353/69, 353/70, 71, 74, 30, 31, 119; 348/745, 744, 348/750, 751, 658, 657; 252/299.61; 250/548
See application file for complete search history.

(56) References Cited

U.S. PATENT DOCUMENTS

| | | | | |
|---|---|---|---|---|
| 5,622,417 A * | 4/1997 | Conner et al. | ............. | 353/69 |
| 6,520,647 B2 * | 2/2003 | Raskar | ............. | 353/70 |
| 6,636,274 B1 * | 10/2003 | Mazda et al. | ............. | 348/745 |
| 6,846,081 B2 * | 1/2005 | Mochizuki et al. | ............. | 353/70 |
| 6,974,217 B2 * | 12/2005 | Kimura et al. | ............. | 353/69 |
| 7,125,122 B2 * | 10/2006 | Li et al. | ............. | 353/31 |
| 7,609,228 B1 * | 10/2009 | Teng | ............. | 345/1.3 |
| 2002/0093627 A1 * | 7/2002 | Oehler | ............. | 353/69 |
| 2003/0156229 A1 | 8/2003 | Samman et al. | | |
| 2004/0036844 A1 * | 2/2004 | Wood et al. | ............. | 353/70 |
| 2006/0231794 A1 * | 10/2006 | Sakaguchi et al. | ....... | 252/299.61 |
| 2007/0030460 A1 * | 2/2007 | Mehrl | ............. | 353/79 |
| 2008/0002041 A1 * | 1/2008 | Chuang et al. | ............. | 348/241 |

FOREIGN PATENT DOCUMENTS

| | | | |
|---|---|---|---|
| CA | 2086893 A1 | 1/1993 |
| JP | 5-191756 A | 7/1993 |
| JP | 8-88860 A | 4/1996 |
| JP | 8-289237 A | 11/1996 |
| JP | 2005-518732 A | 6/2005 |
| JP | 2006-186469 A | 7/2006 |
| JP | 2007-13810 A | 1/2007 |

* cited by examiner

*Primary Examiner* — Georgia Y Epps
*Assistant Examiner* — Sultan Chowdhury
(74) *Attorney, Agent, or Firm* — Birch, Stewart, Kolasch & Birch, LLP.

(57) ABSTRACT

A rear projection display includes a projector for projecting light from a light source as an optical image, an exterior cabinet for enclosing the projector, a projection screen provided for the exterior cabinet on which the optical image is projected, and two or more optical sensors provided in a region where the optical image is projected from the projector other than an image display region.

3 Claims, 5 Drawing Sheets

REAR PROJECTION DISPLAY

FIELD OF THE INVENTION

The present invention relates to a projection display, and more particularly to a rear projection display capable of correcting for a distortion of an image projected on a screen.

DESCRIPTION OF THE BACKGROUND ART

A projection display is capable of converting light from a light source into an optical image in accordance with an image signal using a display device and projecting the optical image on a screen enlargedly by means of a projection lens, thereby providing a large-scale image. There are various types of projection displays, one of which is a rear projection display for projecting an image from the rear face of a projection screen.

Projection displays, however, have the drawback of creating a vertical and horizontal trapezoidal distortion in a projected image depending on the positional relationship between the screen and projector. Further, many projection displays have an optical component such as a mirror on an optical path from the projector to the screen, which creates a distortion of a display image depending on the optical characteristics of the optical component. Such distortion resulting from the optical characteristics of the optical component has a complicated shape containing a quadratic or higher order component, rather than a vertical and horizontal trapezoidal shape.

To solve the above-described problems, a projection display capable of correcting for a distortion created in a display image is required. A projection display having such function is provided with reflection members on the four corners of the screen for displaying an image and detecting the intensity of reflected light from the reflection members by an optical sensor to obtain positional information of the four reflection members, thereby automatically correcting for a vertical and horizontal trapezoidal distortion of a display image (cf. Japanese Patent Application Laid-Open No. 2006-186469). There is another type of projection display of automatically detecting the position of the screen edge, capturing a plurality of adjusting points displayed on the screen with a camera, calculating a displacement of each adjusting point displayed on the screen from a predetermined reference point by image processing, and correcting for a distortion of a display image on the basis of the result of calculation (cf. Japanese Patent Application Laid-Open No. 8-88860 (1996)).

However, the projection display described in the above-mentioned JP2006-186469 is capable of correcting for a vertical and horizontal trapezoidal distortion using positional information of the reflection members disposed on the four corners of the screen, but incapable of correcting for a distortion resulting from the optical characteristics of the optical component provided for the display. Further, it is difficult in a rear projection display to detect reflected light from reflection members.

A projector described in the above-mentioned JP8-88860 is limited to a CRT projector, and when capturing an image of the screen with a camera built in the rear projection display, it is difficult to detect the screen by image processing due to the presence of structural members such as a frame for fixing the screen, and an image processor is accordingly required.

SUMMARY OF THE INVENTION

An object of the present invention is to provide a rear projection display capable of correcting for a distortion of an image projected on a screen.

The rear projection display according to the present invention includes a projector configured to project light from a light source as an optical image, a cabinet configured to enclose the projector, a projection screen provided for the cabinet on which the optical image is projected, and two or more sensors provided in a region where the optical image is projected from the projector other than an image display region.

The provision of the two or more sensors in the region where the optical image is projected from the projector other than the image display region permits correction for a distortion of an image projected on the screen.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
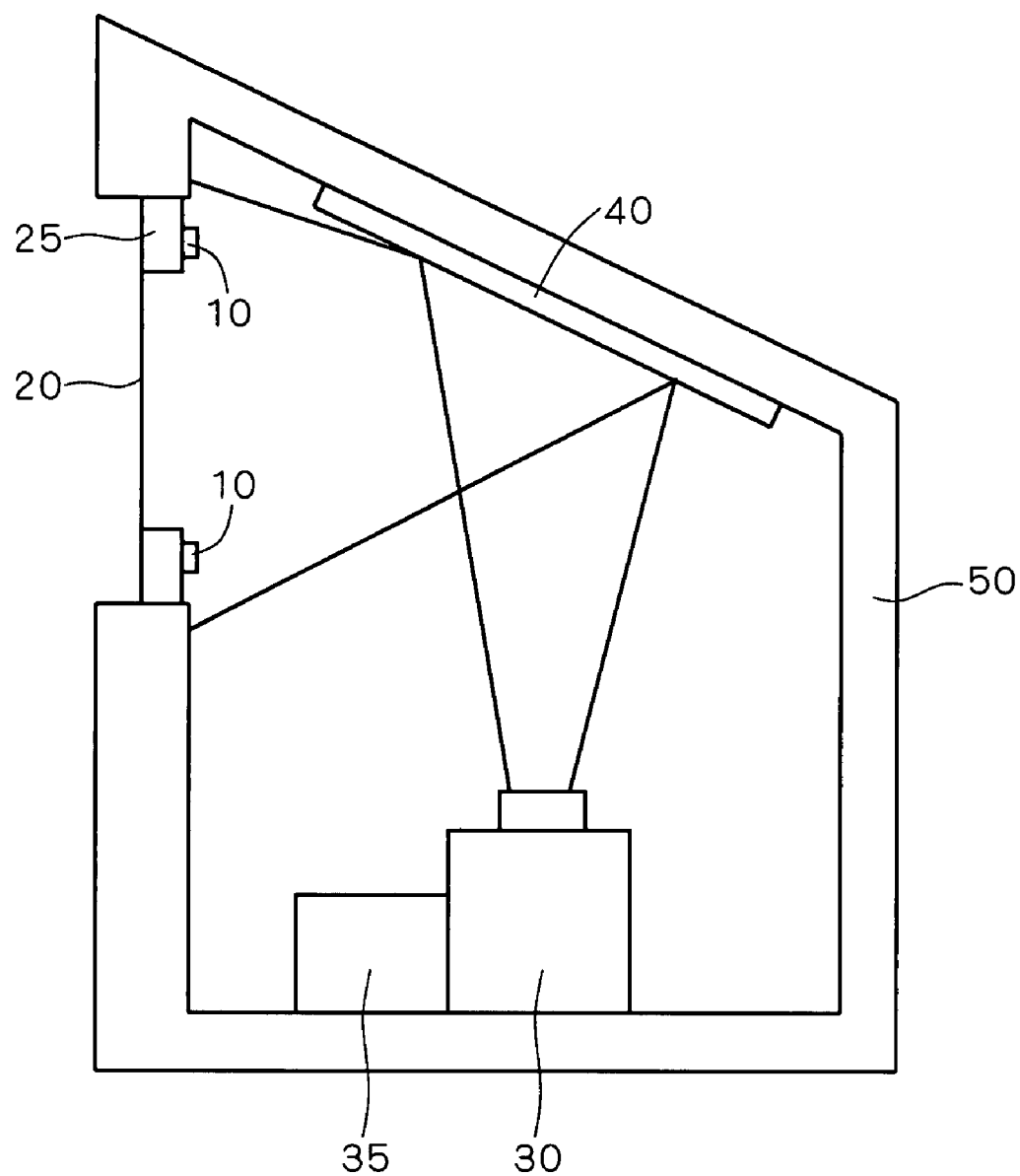
FIG. 1 is a structural drawing of a rear projection display according to a first preferred embodiment of the present invention.

FIG. 1 is a structural drawing of a rear projection display according to a first preferred embodiment of the present invention. As shown in FIG. 1, the rear projection display includes a projector 30 for projecting light from a light source as an optical image, an exterior cabinet 50 for enclosing the projector 30, a projection screen 20 provided for the exterior cabinet 50 on which the optical image from the projector 30 is projected, a frame 25 provided for the exterior cabinet 50 for fixing the projection screen 20, and optical sensors 10 provided on the frame 25 in positions other than an image display region 61 (cf. FIG. 2). A mirror 40 is intended to reflect the optical image projected from the projector 30 toward the projection screen 20, and a signal processor 35 is intended to control the optical image projected from the projector 30 on the basis of a signal received from the optical sensors 10.

The projector 30 converts light from the light source using the display device into an optical image in accordance with an image signal for projection. The optical image projected from the projector 30 is reflected off the mirror 40 to be projected toward the projection screen 20 and frame 25. The optical image projected on the projection screen 20 passes through the projection screen 20 to be displayed as an image. The optical sensors 10 provided on the frame 25 each receive the projected light image and transmit a signal in accordance with the intensity of received light, to the signal processor 35. The signal processor 35 corrects for a distortion of the image projected on the projection screen 20 on the basis of the signals received from the optical sensors 10, and transmits a corrected image signal to the projector 30.

Figure 2:
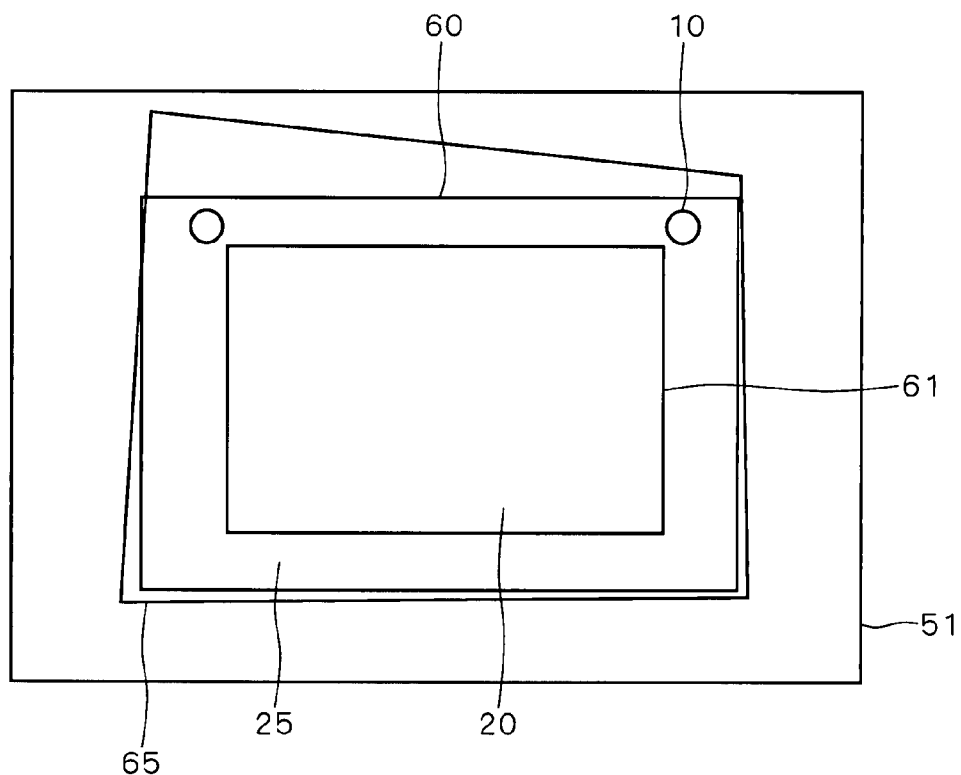
FIGS. 2 and 3 are structural drawings of an exterior cabinet front surface according to the first preferred embodiment.

FIG. 2 is a structural drawing of an exterior cabinet front surface according to the first preferred embodiment. As shown in FIG. 2, the projection screen 20 is provided on the frame 25 on an exterior cabinet front surface 51. The optical sensors 10 are provided in two positions near the upper left and right edges of the frame 25, respectively. The optical image emitted from the projector 30 and reflected off the mirror 40 is projected on the exterior cabinet front surface 51. An ideal image projection region 60 is similar in shape but larger than the projection screen 20 to include the optical sensors 10 on the frame 25. An actually-projected image 65 is an image actually projected on the projection screen 20, and has a distortion. The image display region 61 is a region where an image for use in display in the image projected from the projector 30 is displayed. The rear projection display hardly displays the whole image as projected, and a several percent of the image on the periphery is not displayed as an overscan region. To make the actually-projected image 65 have the shape of the ideal image projection region 60, the distortion of the actually-projected image 65 needs to be corrected.

Correcting for the actually-projected image 65 to become close to the shape of the ideal image projection region 60 requires positional information of the optical sensors 10 in the ideal image projection region 60 and positional information of the optical sensors 10 when the actually-projected image 65 is projected. The positional information of the optical sensors 10 in the ideal image projection region 60 may previously be stored in the signal processor 35 as data and may be read out when in use since the position and size of the ideal image projection region 60 and the positions of the optical sensors 10 are determined.

Figure 3:
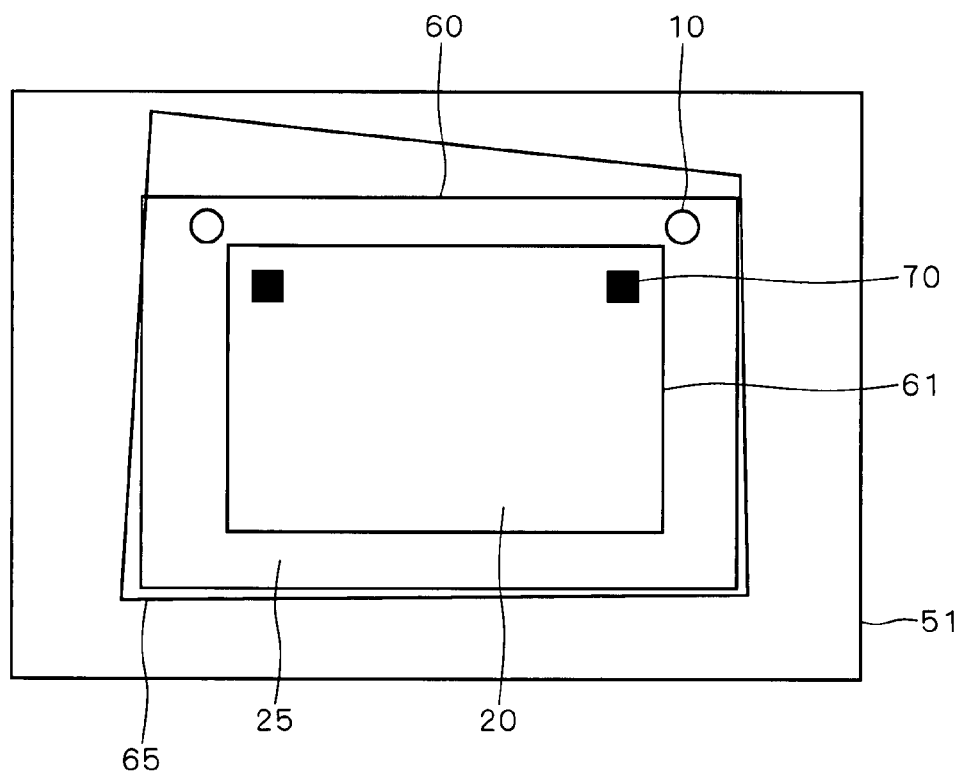

The positional information of the optical sensors 10 when the actually-projected image 65 is projected is obtained by projecting a test image on the projection screen 20 from the projector 30. FIG. 3 shows the state where a test image having detection points 70 is projected on the exterior cabinet front surface 51. The number of detection points 70 is the same as that of the optical sensors 10, i.e., two in this embodiment. The optical sensors 10 detect the detection points 70 of the test image. The detection points 70 each have a square shape with two dots on each side, for example. The detection points 70 may have any size such as 1, 2, 4 or 8 dots on each side, but should be placed not to overlap each other. To increase the accuracy in distortion correction, the precise position of the optical sensors 10 needs to be obtained, which requires the detection points 70 to be reduced in size. In contrast, to reduce the time for distortion correction, the detection points 70 need to be increased in size so as to be easily detected by the optical sensors 10. To facilitate the detection of the detection points 70 by the optical sensors 10, the detection points 70 need to have a bright and distinctive color. In the present embodiment, the detection points 70 shall be white, and the background of the test image other than the detection points 70 shall be black. The optical sensors 10 each transmit an output signal in accordance with the intensity of received light, to the signal processor 35. That is, the output signal differs between light from the white detection points 70 and light from the black region other than the detection points 70, allowing the detection points 70 to be detected. The test image shall be of shape that coincides with the ideal image projection region 60 when projected on the projection screen with no distortion, and the detection points 70 shall be positioned so as to overlap or come close to the optical sensors 10. The detection points 70 at this time correspond to the optical sensors 10, and become reference points. The detection points 70 as reference points may previously be stored in the signal processor 35 as data as initial positions and may be read out according to necessity.

When there is a distortion, an image signal needs to be adjusted such that the display position of each of the two detection points 70 coincides with the position of a corresponding one of the optical sensors 10 in order that the detection points 70 in the test image projected on the exterior cabinet front surface 51 are detected by the optical sensors 10. First, it is judged whether one of the detection points 70 coincides with the position of a corresponding one of the optical sensors 10. Upon detection of white light reflected from the one of the detection points 70 by the corresponding one of the optical sensors 10, the judgment is made by the signal processor 35 having received an output signal from the one of the optical sensors 10. When the result of judgment is that the one of the detection points 70 coincides with the corresponding one of the optical sensors 10 in position, the position of that detection point 70 does not need to be changed. When that detection point 70 does not coincide with the corresponding optical sensor 10 in position, the display position of that detection point 70 is shifted by 1 bit in any one of upward, downward, leftward and rightward directions. The amount of shift from the initial position of that detection point 70 is stored in the signal processor 35. This operation is repeated until that detection point 70 coincides with the corresponding optical sensor 10 in position. In this manner, the displacement of a projected display image, that is, the degree of distortion can be obtained from the initial position and final amount of shift of each of the detection points 70.

Figure 4:
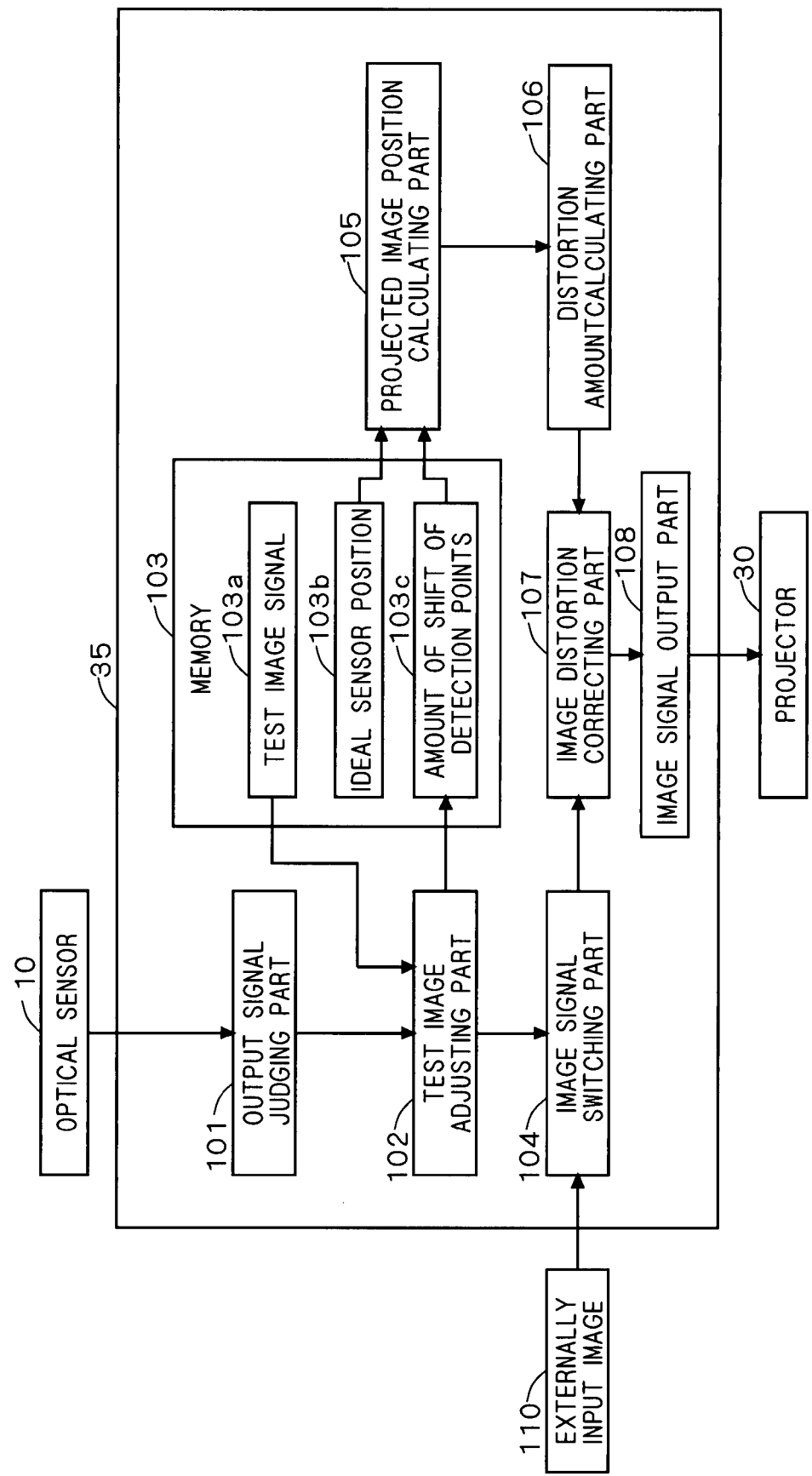
FIG. 4 is a block diagram of a signal processor according to the first preferred embodiment.

FIG. 4 is a block diagram of the signal processor 35 according to the first preferred embodiment. As shown in FIG. 4, a memory 103 is capable of previously storing data and permits data to be read therefrom and written therein. A memory 103a stores a test image signal for detecting the detection points 70 by the optical sensors 10 for measurement. A memory 103b stores positional information of the optical sensors 10 in the ideal image projection region 60, and a memory 103c stores the amount of shift of each of the detection points 70. The procedure of operation will be described below.

First, a test image signal is read out from the memory 103a to be transmitted to the projector 30 through an image signal output part 108. At this time, a test image adjusting part 102 does not carry out adjustment, and an image distortion correcting part 107 does not carry out correction. An image signal switching part 104 is intended to display a test image. The test image is projected from the projector 30, and an optical sensor 10 receives the projected test image. The optical sensor 10 outputs a light intensity signal of received light to the signal processor 35. An output signal judging part 101 judges whether the optical sensor 10 has received white light from a corresponding one of the detection points 70. When it is judged that white light has not been received, hence, the detection points 70 have not been received, the test image adjusting part 102 shifts the detection point 70 by the test image signal stored in the memory 103a for adjustment, and the image signal output part 108 outputs the result of adjustment to the projector 30. The amount of shift of the detection point 70 is stored in the memory 103c. The image distortion correcting part 107 does not carry out correction during the procedure of detecting the detection point 70 in the test image by the optical sensor 10. This operation is repeated until the output signal judging part 101 detects all the detection points 70.

Upon completion of detection of all the detection points 70, the amount of image distortion correction is calculated from the amount of shift of the detection points 70, and an image whose distortion has been corrected is projected from the projector 30. A projected image position calculating part 105 reads the positional information of the optical sensors 10 in the ideal image projection region 60 stored in the memory 103b and the amount of shift of the detection points 70 stored in the memory 103b, to thereby calculate the position of an image when projected on the projection screen 20. Then, the difference between the positional information of the optical sensors 10 in the actually-projected image 65 and positional information of the optical sensors 10 in the ideal image projection region 60. A distortion amount calculating part 106 calculates the amount of distortion of the projected image based on the result obtained by the projected image position calculating part 105. The image distortion correcting part 107 executes signal processing of correcting for an image distortion in image data based on the amount of distortion obtained by the distortion amount calculating part 106. The image data whose distortion has been corrected by the image distortion correcting part 107 is transmitted to the projector 30 through the image signal output part 108.

The above operation permits calculation of the amount of distortion of the projected image from the difference between the positional information of the optical sensors 10 in the actually-projected image 65 and positional information of the optical sensors 10 in the ideal image projection region 60, and correction of the image by the calculated amount of distortion. An image without distortion is thereby displayed in the image display region 61 on the projection screen 20 when the image signal switching part 104 is switched toward an externally input image 110.

Second Preferred Embodiment

Figure 5:
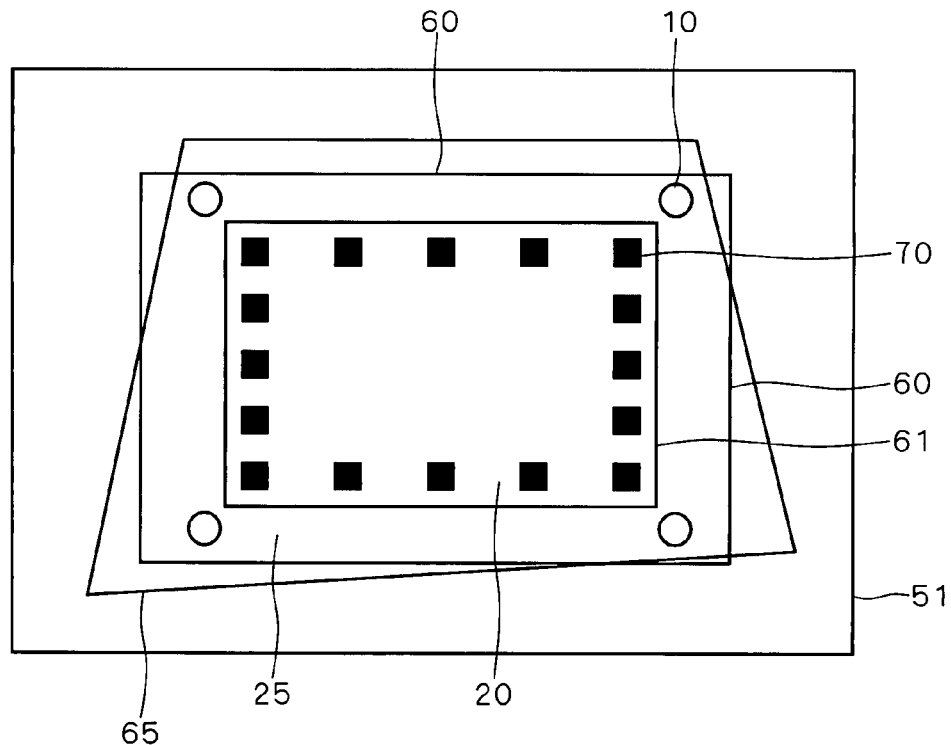
FIG. 5 is a structural drawing of an exterior cabinet front surface according to a second preferred embodiment of the present invention.

FIG. 5 is a structural drawing of an exterior cabinet front surface 51 according to a second preferred embodiment of the present invention. The second preferred embodiment features providing optical sensors 10 one each at each of the four corners of the frame 25, i.e., four optical sensors 10 in total. Four detection points 70 are correspondingly provided to correspond to the respective four optical sensors 10. Other structure and method of operation are similar to those of the first preferred embodiment, and thus omitted here.

This structure permits correction for a vertical and horizontal trapezoidal distortion of an image projected from the projector 30.

Third Preferred Embodiment

Figure 6:
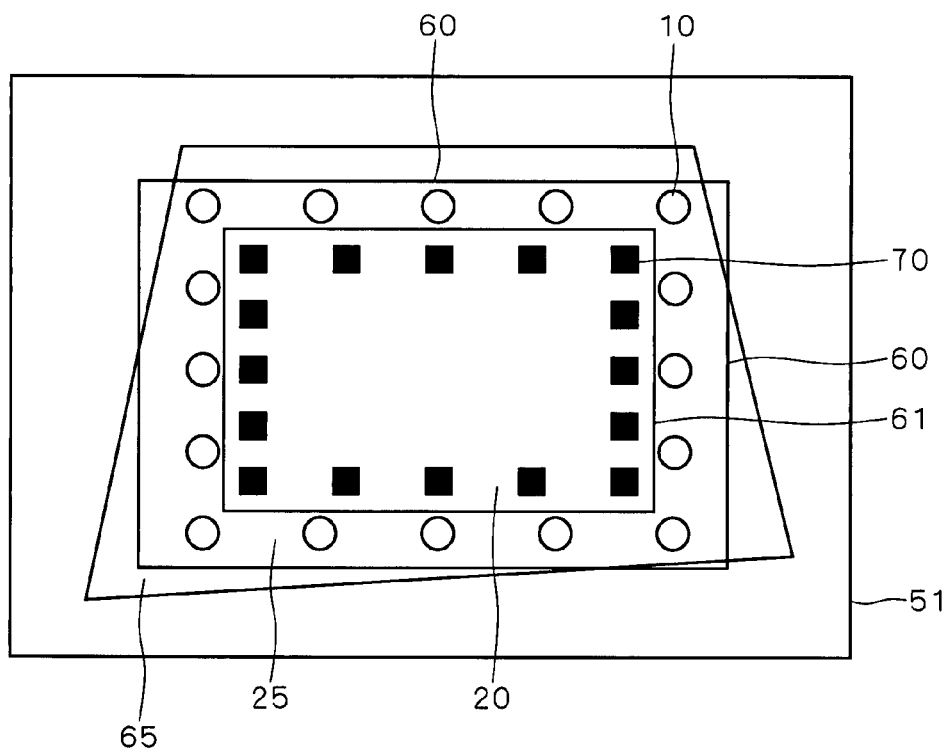
FIG. 6 is a structural drawing of an exterior cabinet front surface according to a third preferred embodiment of the present invention.

FIG. 6 is a structural drawing of an exterior cabinet front surface 51 according to a third preferred embodiment of the present invention. The third preferred embodiment features providing optical sensors 10 one each at each of the four corners of the frame 25 and three each between two adjacent optical sensors 10, i.e., sixteen optical sensors 10 in total. Other structure and method of operation are similar to those of the first preferred embodiment, and thus omitted here.

This structure permits correction for not only a vertical and horizontal trapezoidal distortion of an image projected from the projector 30, but also an image with a distortion containing a quadratic or higher order component.

Fourth Preferred Embodiment

Figure 7:
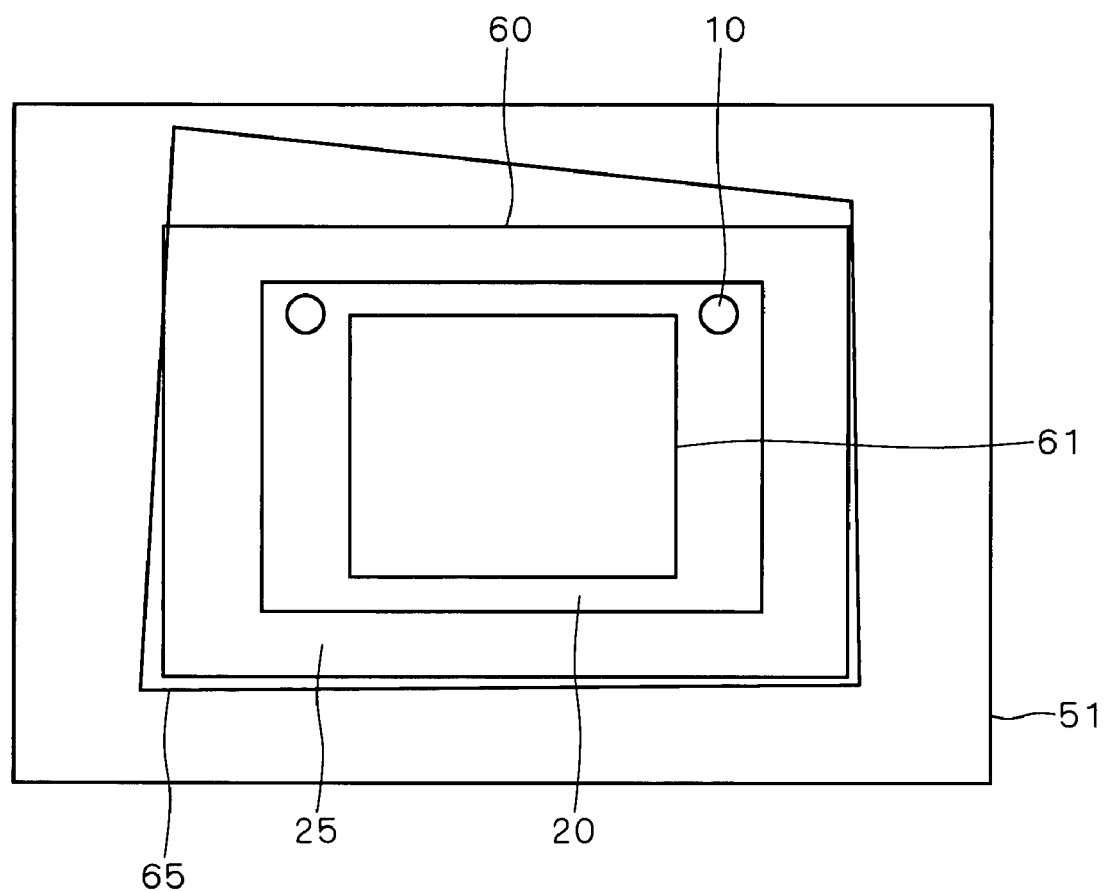
FIG. 7 is a structural drawing of an exterior cabinet front surface according to a fourth preferred embodiment of the present invention.

FIG. 7 is a structural drawing of an exterior cabinet front surface 51 according to a fourth preferred embodiment of the present invention. The fourth preferred embodiment features providing the optical sensors 10 on the projection screen 20 outside the image display region 61, rather than on the frame 25. Other structure and method of operation are similar to those of the first preferred embodiment, and thus omitted here.

Further, providing the optical sensors 10 one each at each of the four corners of the frame 25 permits correction for a vertical and horizontal trapezoidal distortion of an image. Furthermore, providing optical sensors 10 one each at each of the four corners of the frame 25 and three each between two adjacent optical sensors 10 permits correction for not only a vertical and horizontal trapezoidal distortion of an image, but also an image with a distortion containing a quadratic or higher order component.

While the invention has been shown and described in detail, the foregoing description is in all aspects illustrative and not restrictive. It is therefore understood that numerous modifications and variations can be devised without departing from the scope of the invention.

What is claimed is:

1. A rear projection display comprising:
    a projector configured to project light from a light source as an optical image;
    a cabinet configured to enclose said projector;
    a projection screen on which said optical image is projected;
    two or more optical sensors provided in a region where said optical image is projected from said projector other than an image display region;
    a projecting part configured to project a test image having detection points to be detected by said two or more optical sensors other than said image display region on said projection screen from said projector;
    a position calculating part configured to calculate the position of said test image projected from said projecting part on the basis of output signals from said two or more optical sensors; and
    a distortion correcting part configured to correct for a distortion of said test image on the basis of the result of the calculation made by said position calculating part.

2. The rear projection display according to claim 1, wherein said two or more optical sensors are provided on a frame of said cabinet for fixing said projection screen.

3. The rear projection display according to claim 1, wherein said two or more optical sensors are provided on said projection screen.

* * * * *